(12) United States Patent
Yamazoe

(10) Patent No.: US 8,849,066 B2
(45) Date of Patent: Sep. 30, 2014

(54) IMAGE PROCESSING APPARATUS, IMAGE PROCESSING METHOD, AND STORAGE MEDIUM

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/553,648

(22) Filed: Jul. 19, 2012

(65) Prior Publication Data

US 2013/0022293 A1    Jan. 24, 2013

(30) Foreign Application Priority Data

Jul. 23, 2011 (JP) .................................. 2011-161438

(51) Int. Cl.
*G06K 9/32* (2006.01)
*G06T 5/00* (2006.01)

(52) U.S. Cl.
CPC .. *G06K 9/32* (2013.01); *G06T 5/003* (2013.01)
USPC ............................. 382/298; 382/218; 382/276

(58) Field of Classification Search
CPC ....... G06T 3/40; G06T 3/4007; G06T 3/4023; G06T 2207/10056; G06T 2207/30148; G06T 7/001; H04N 1/3935; H04N 1/393; H04N 21/42653; H04N 21/4312; H04N 21/4314; H04N 21/482; H04N 5/44591; G06K 2209/19; G06K 9/033; G06F 1/00; G06F 2003/00; G06F 2101/00; G06F 2200/00; G06F 2201/00

USPC ......... 382/145, 149, 154, 176, 218, 298, 300; 346/3; 347/3; 345/660, 698, 663, 649; 348/E5.104; 358/448, 453, 1.2, 525, 358/451, 1.9, 3.26, 3.27
See application file for complete search history.

(56) References Cited

U.S. PATENT DOCUMENTS

| | | | | | |
|---|---|---|---|---|---|
| 4,394,693 | A  * | 7/1983 | Shirley | ............................ | 358/1.2 |
| 5,086,346 | A  * | 2/1992 | Fujisawa | ........................ | 358/453 |
| 6,915,026 | B2 * | 7/2005 | Sasai | ............................... | 382/300 |
| 6,958,759 | B2 * | 10/2005 | Safadi et al. | .................. | 345/660 |
| 7,202,878 | B2 * | 4/2007 | Safadi et al. | .................. | 345/660 |
| 7,433,079 | B2 * | 10/2008 | Kotani | ............................ | 358/1.9 |
| 8,026,936 | B2 * | 9/2011 | Ting | ................................ | 345/698 |
| 8,121,397 | B2 * | 2/2012 | Harada et al. | ................. | 382/149 |

FOREIGN PATENT DOCUMENTS

JP    2009-98435 A    5/2009

* cited by examiner

*Primary Examiner* — Anh Do
(74) *Attorney, Agent, or Firm* — Canon USA, Inc. IP Division

(57) ABSTRACT

The present invention provides an image processing apparatus which can simply and appropriately analyze an image, an image processing method, and a storage medium. The present invention reduces an original image and enlarges a reduced image obtained by the reduction. The present invention enlarges the original image. The present invention analyzes the original image by comparing a first enlarged image obtained by enlargement of the reduced image with a second enlarged image obtained by enlargement of the original image.

19 Claims, 8 Drawing Sheets

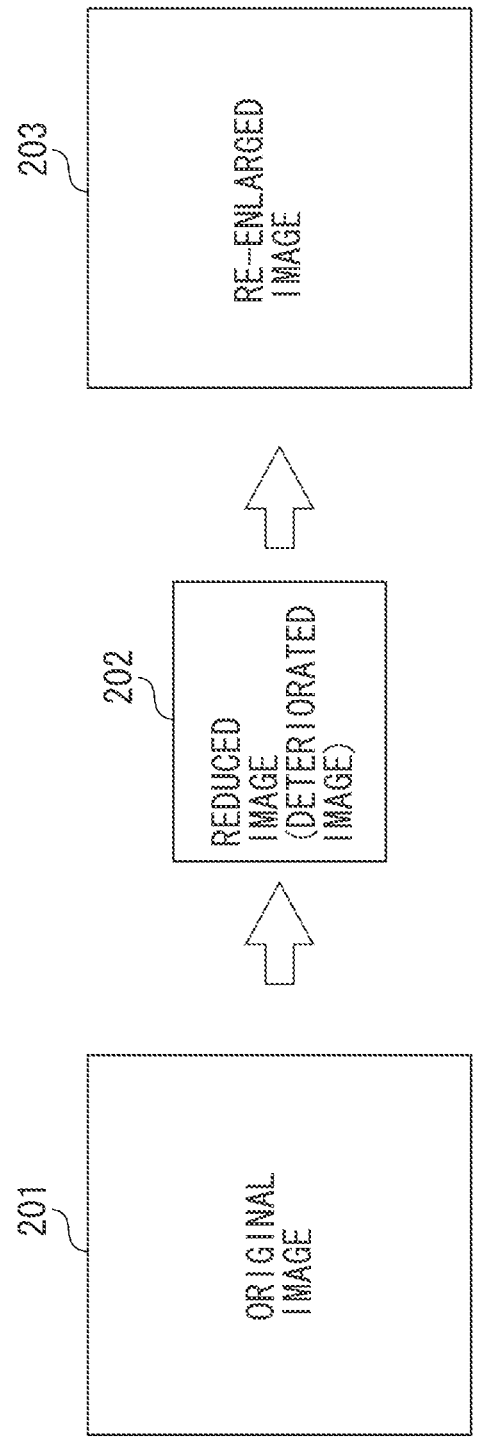

FIG. 3A
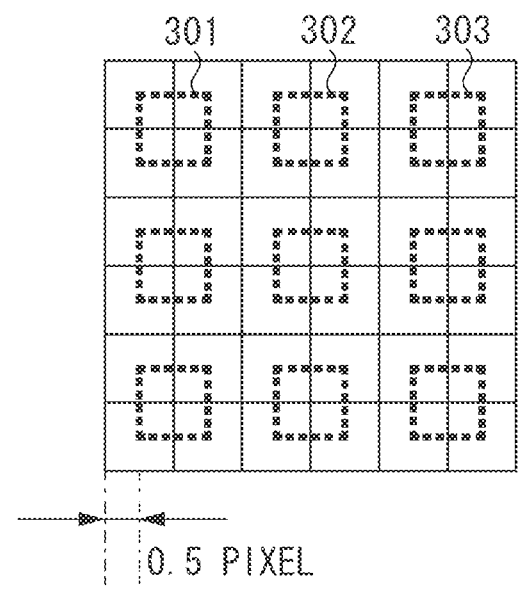
0.5 PIXEL
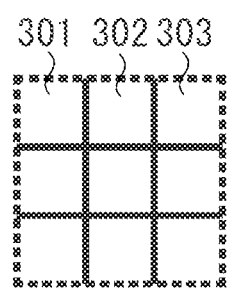

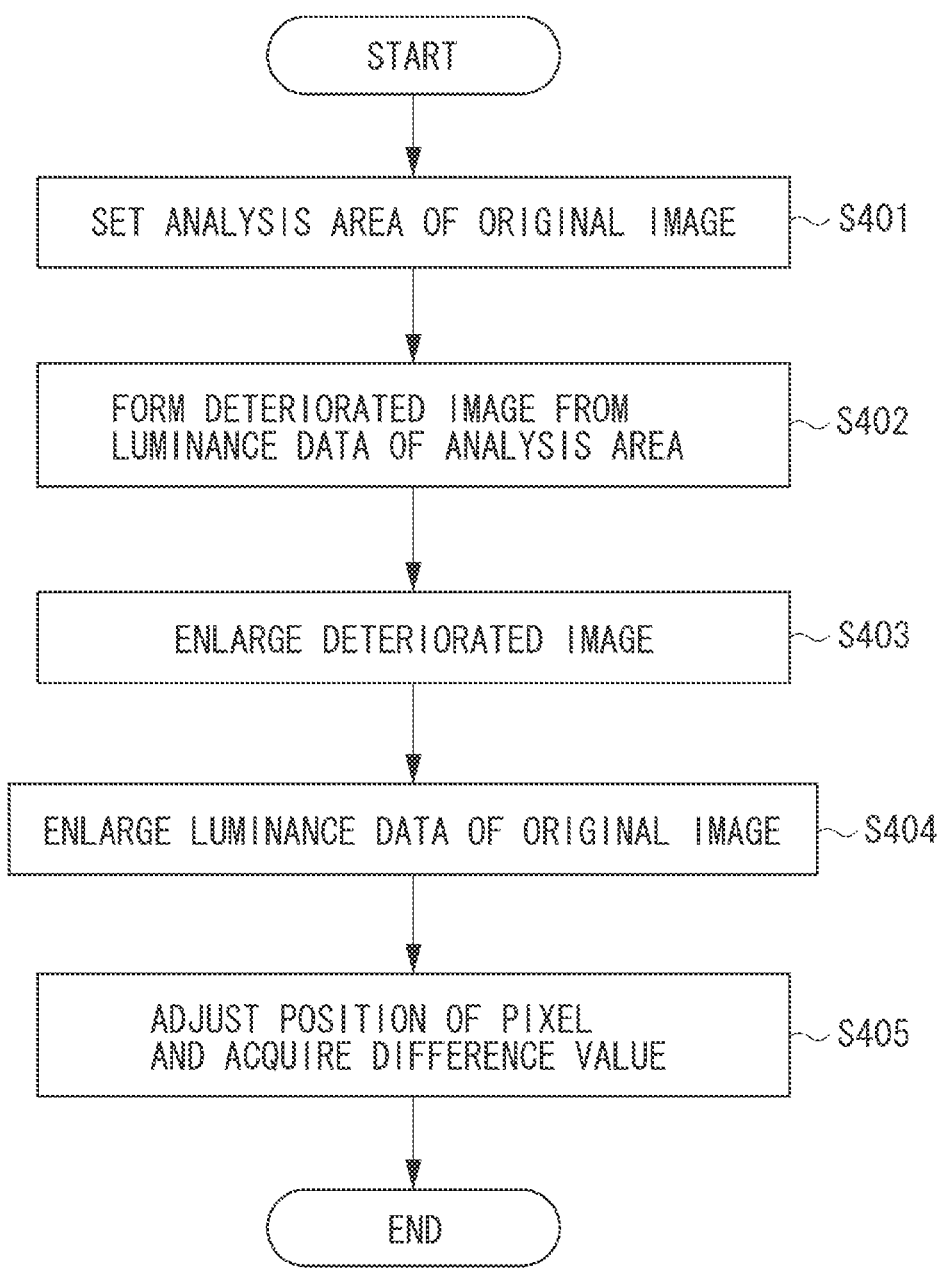

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus configured to analyze an image, an image processing method, and a storage medium.

2. Description of the Related Art

Conventionally, there is an image in which "camera shake" during photographing and "subject shake" caused by subject moving occur, as a poor-quality digital image. Furthermore, there is an image in which "blur" caused by being unable to adjust a focal length to a main subject during photographing occurs. Japanese Patent Application Laid-Open No. 2009-98435 discusses a method for analyzing the poor-quality digital image. The method produces a blurred image using a filter for an original image, and measures an in-focus degree of the original image according to a difference amount when comparing the original image with the blurred image.

The conventional technique generates the blurred image using the filter. However, when an analysis target image is subjected to blur processing using the filter, a processing load is increased.

SUMMARY OF THE INVENTION

The present invention is directed to an image processing apparatus which can appropriately analyze an image by simple processing when analyzing the image, an image processing method, and a storage medium.

According to an aspect of the present invention, an image processing apparatus includes a reduction unit configured to reduce an original image; a first enlargement unit configured to enlarge a reduced image obtained by reduction of the reduction unit; a second enlargement unit configured to enlarge the original image; and an analysis unit configured to analyze the original image by comparing a first enlarged image obtained by enlargement of the first enlargement unit with a second enlarged image obtained by enlargement of the second enlargement unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a shake blur estimation method of the present exemplary embodiment.

FIGS. 3A, 3B, and 3C illustrate pixel shift according to reduction and enlargement processings of an image.

FIG. 4 is a flow chart illustrating a procedure of shake blur estimation of the present invention.

DESCRIPTION OF THE EMBODIMENTS

Various exemplary embodiments, features, and aspects of the invention will be described in detail below with reference to the drawings.

Figure 1:
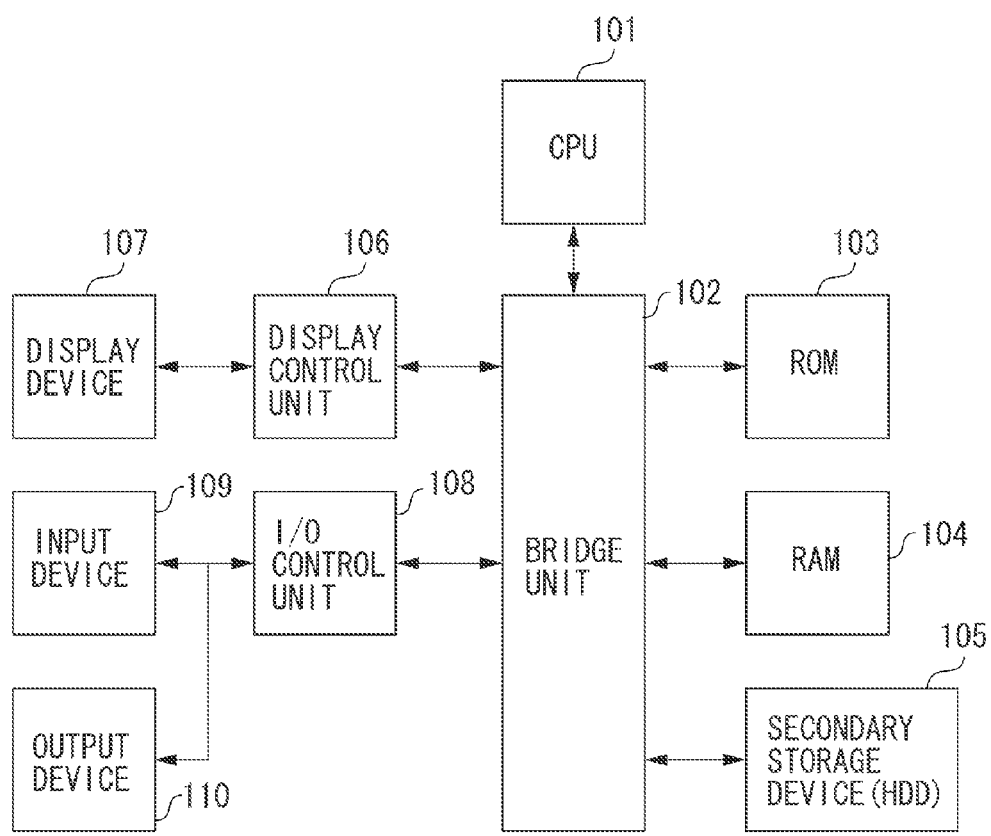
FIG. 1 is a block diagram of an image processing apparatus.

FIG. 1 is a block diagram of an image processing apparatus in the present exemplary embodiment. A central processing unit (CPU) 101 controls other functional blocks or devices. A bridge unit 102 provides a function to control transmission/reception of data between the CPU 101 and the other functional blocks. A read-only memory (ROM) 103 is a read-only nonvolatile memory, and stores a program called a Basic Input/Output System (BIOS). The BIOS is a program executed first when an image processing apparatus is activated and controls a basic input/output function of peripheral devices, such as a secondary storage device 105, a display device 107, an input device 109, and an output device 110.

A random access memory (RAM) 104 provides a storage region where fast read and write are enabled. The secondary storage device 105 is an HDD (Hard Disk Drive) which provides a large-capacity storage region. When the BIOS is executed, an operating system (OS) stored in the HDD is executed. The OS provides basic functions which can be used by all applications, management of the applications, and a basic graphical user interface (GUI). It is possible for an application to provide a user interface (UI) which realizes a function unique to the application by combining GUIs provided by the OS.

The OS, an execution program of another application, and data used for working are stored in the ROM 103 or the secondary storage device 105 according to the necessity. An image processing application realizing the present invention is stored in the ROM 103 or the secondary storage device 105, and is provided as an application activated by a user's operation. The CPU 101 executes, with the RAM 104 as a work memory, the programs stored in the ROM 103 and the secondary storage device 105, such as the OS and the image processing application, to realize processing to be described below.

A display control unit 106 controls to generate image data of the GUI of the result of the operation by a user performed for the OS or application and display the image data on the display device 107. As the display device 107, a liquid crystal display or a cathode ray tube (CRT) display may be used.

An input/output (I/O) control unit 108 provides an interface between the plurality of input devices 109 and output devices 110. Representative examples of the interface include a universal serial bus (USB) and Personal System/2 (PS/2).

The input device 109 includes operation devices, such as a keyboard and a mouse. The I/O control unit 108 inputs user's instructions to the image processing apparatus via the input device 109.

The I/O control unit 108 connects various data to the output device 110. The output device 110 may be a printer, for example. The I/O control unit 108 outputs print data to the output device 110, and thereby the output device 110 can print an image corresponding to the print data.

A digital camera or a storage device, such as a USB memory, a Compact Flash (CF) memory, or an Secure Digital (SD) memory card, or the like may be also connected to the image processing apparatus. The I/O control unit 108 can transmit data, such as image data, to the digital camera or the memory, and conversely also can acquire the data from the digital camera or the memory.

In the present exemplary embodiment, shake and blur in a frame (still image) included in a moving image are determined, which will be described below. The moving image data is supplied from the secondary storage device 105, or the USB memory, the CF memory, and the SD memory card which are connected to the image processing apparatus.

In the present exemplary embodiment, the still image included in the moving image is reduced, and the reduced still image is enlarged. The reduced and enlarged still image is compared with a still image which is not subjected to the reduction processing, to determine the shake and blur of the still image. The determination of the shake and blur will be described with reference to FIG. 2.

FIG. 2 illustrates a shake blur estimation method of the present exemplary embodiment. First, a predetermined area 201 of an original image is reduced to form a reduced image 202. The reduction processing is performed by, for example, thinning pixels of the original image or taking the average of a plurality of pixel values of the original image to form a new pixel. The image quality of the reduced image 202 thus reduced is deteriorated than that of the original image as much as an information amount decreased than that of the original image. The reduced image 202 is re-enlarged to generate a re-enlarged image 203. The enlargement processing is performed by generating a new pixel using the pixel included in the reduced image 202. Specifically, a pixel value of the new pixel is determined by the pixel value of the pixel included in the reduced image 202. The re-enlarged image 203 is generated so that the pixel of the pixel value is arranged between the pixels of the reduced image 202.

In this case, as described above, the reduced image 202 is formed by thinning processing or averaging processing of the pixel of the original image. Therefore, even if the reduced image 202 is re-enlarged to produce the re-enlarged image 203, the re-enlarged image 203 does not return to the original image 201. Consequently, a difference is generated in no small measure in the original image 201 and the re-enlarged image 203.

If the shake and the blur in the image are considered to be deterioration caused by convoluting peripheral pixel data to pixel data to be originally present, the shake and the blur are generated in the image by the above described reduction and enlargement processings of the image. Therefore, when the shake amount and blur amount of the original image 201 are originally large, there is no significant change even if the reduction and the enlargement are performed. However, when the shake amount and blur amount of the original image are small, the shake and the blur are generated for the first time by the reduction and the enlargement. Consequently, the difference amount in the case where the shake amount and blur amount of the original image 201 are originally large is different from the difference amount in the case where the shake amount and the blur amount are small. Specifically, it is considered that the more the original image contains an image originally including shakes and blurs, the more the difference amount is decreased.

Accordingly, in the present exemplary embodiment, the shake and blur of the original image are determined according to the difference value between the image obtained by reducing and enlarging the original image and the original image.

When the image is subjected to reduction processing in the present exemplary embodiment, the image is reduced by the above described averaging processing. Specifically, the average of the pixel values of a plurality of pixels included in the original image is taken. A pixel having the average value is a pixel of the reduced image.

When the difference between the original image 201 and the re-enlarged image 203 is taken in the present exemplary embodiment, the pixel values (pixel levels) of the pixels included in both the images are compared with each other, and the difference between the original image 201 and the re-enlarged image 203 is determined according to the number of pixels having a difference equal to or greater than a predetermined value. The pixel value may be various data, such as brightness and density.

As the number of pixels subjected to averaging is increased in the reduction processing, the number of the pixels of the original image convoluted to one pixel of the reduced image is increased, and the difference with the original image is generated in a wide range. Thereby, the difference with the original image is apt to be generated when re-enlarged and comparing. Specifically, a difference generated by a dull edge portion and a difference caused by convoluting pixels in a larger range are mixed, and the latter difference acts as noise in a shake blur estimation value. In other words, as the number of the pixels to be convoluted is increased when the difference is an evaluation amount of shake blur estimation, the difference acts as noise when obtaining the evaluation amount.

In this case, even if the original image has more shakes and blurs, the difference with the original image is increased by reducing and enlarging the image. Therefore, the original image may be erroneously determined to be an image having less shake and blur.

Therefore, the pixel subjected to averaging is desirably specified in the possible minutest area in the original image. Therefore, in the present exemplary embodiment, areas of 2×2 pixels in the original image are averaged. The averaging will be described in detail with reference to FIG. 3.

In the present exemplary embodiment, as described above, the shake and blur of the image are determined by subjecting the image to reduction and enlargement processings and comparing the image with the original image. However, the shake and blur of the image can also be determined by deciding the sharpness of the image. In this case, it is ideal that an edge can be determined in a pixel unit. However, the difference with a peripheral pixel is utilized as actual digital image processing. There is generally a method for extracting an edge according to filter processing of 3×3 as in a Laplacian filter. However, for example, the number of the minimum pixels used to determine a change from a background to a structure is two. In other words, it is considered that when the change is determined in a width of 3 pixels, a noise component with respect to area fluctuation can also be included as much as the width. Consequently, also in this case not only reduction of operation cost but also the correct determination of the shake and blur can be expected by using a filter of 2×2 pixels.

As described above, in the present exemplary embodiment, the reduced image of ½ is formed by performing averaging processing. However, when the image is enlarged two times, and the image is compared with the original image, the pixel is shifted by ½ pixel from the original position. The shift will be described with reference to FIGS. 3A to 3C.

Figure 3B:
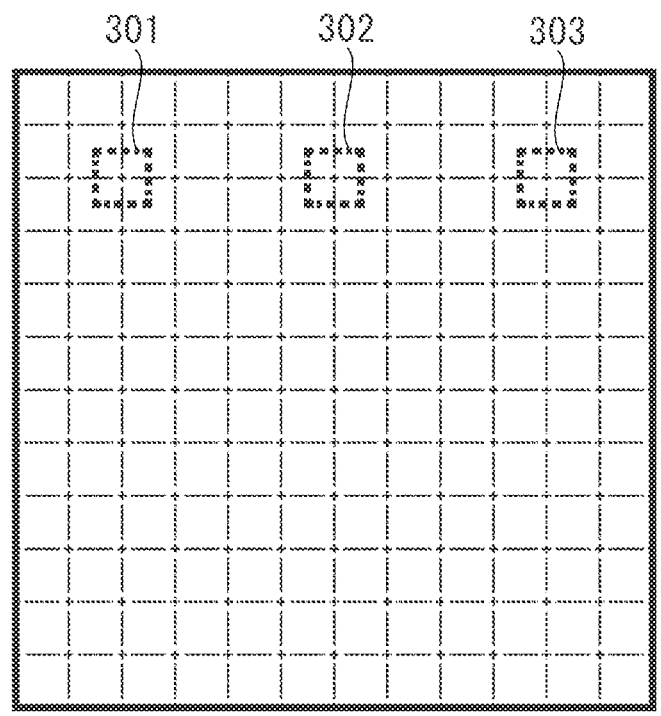
Figure 3C:
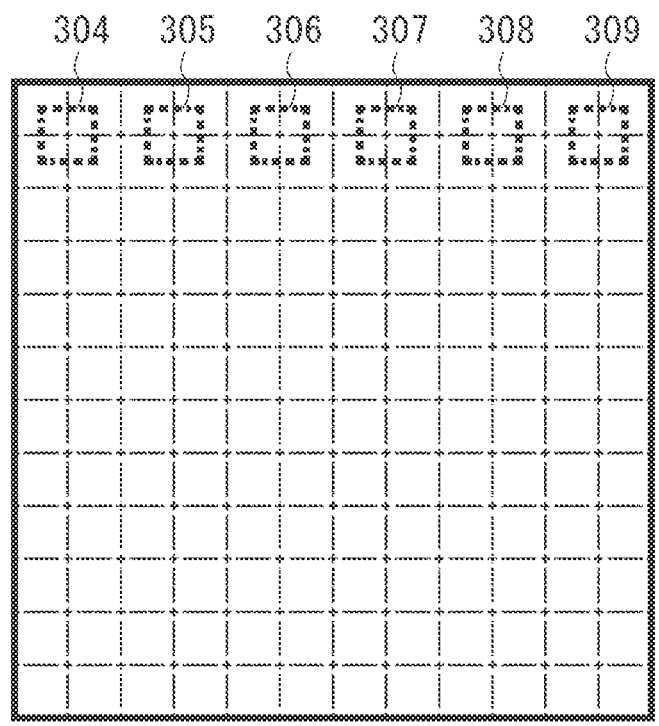

FIGS. 3A to 3C illustrate pixel shift according to reduction and enlargement processings of an image. As described above, 4 pixels (2×2 pixels) are subjected to average processing.

A pixel 301 illustrated by a dotted line in FIG. 3A is a pixel obtained by averaging four pixels illustrated by a solid line around the pixel 301. Four pixels to be subjected to averaging processing are shifted by 2×2 pixels so as not to overlap with the pixels already subjected to averaging processing, and specified. The four pixels are subjected to averaging processing, to sequentially subject a pixel 302 and a pixel 303 to averaging processing in order of the pixel 302 and the pixel 303. Thereby, a reduced image reduced to ½ from the original image is formed.

The reduced image is re-enlarged, and the difference amount with the original image is obtained, to calculate a shake blur estimation amount. For example, a difference may be calculated for each corresponding pixel in the re-enlarged image and the original image and the number of the pixels equal to or greater than a predetermined difference may be an evaluation amount estimated as a shake blur amount of the original image. Alternatively, summation obtained by adding the differences calculated for each pixel for all the pixels may be defined as a shake blur evaluation amount. When the sizes of analysis areas are different, the evaluation amount may be normalized by the number of pixels of the analysis areas.

When attention is directed to the pixel 301 of the reduced image of ½ of FIG. 3A, it is understood that the position of the pixel 301 in the original image is shifted by 0.5 pixel with respect to the pixel included in the original image. The reduced image is enlarged two times to have the same size as that of the original image. At this time, the pixels 301 to 303 cannot be arranged between four pixels, as illustrated in FIG. 3A. Each of the pixels 301 to 303 is arranged at a position corresponding to any one of four pixels when each of the pixels 301 to 303 is averaged. The pixels 301 to 303 to be originally at a position shifted by 0.5 pixel from the pixel of the original image are arranged with the pixels 301 to 303 shifted by 0.5 pixel from the original position. The difference between the pixels 301 to 303 arranged with the pixels 301 to 303 shifted by 0.5 pixel from the original position and the original image is determined.

In the present exemplary embodiment, an enlarged image obtained by quadrupling the reduced image in vertical and horizontal directions is formed. The original image is enlarged two times in vertical and horizontal directions, and both the images are compared with each other. FIG. 3B illustrates an enlarged image obtained by quadrupling the image of ½ reduction. FIG. 3C illustrates an image obtained by enlarging the original image two times, and illustrates original positions 304 to 309 of the pixels of the original image. As illustrated in FIGS. 3B and 3C, it is understood that comparison target pixels in both the two images are shifted by 0.5 pixel from the original positions.

A difference value is constituted by shifting the two images by one pixel in each of horizontal and vertical directions. Therefore, the shift of 0.5 pixel is exactly changed to the shift of 0.5×2=1 pixel, and the two images can be adjusted as a corresponding pixel to be originally present. For example, when illustrated in FIG. 3B and FIG. 3C, the suitable pixels of the two images can be compared with each other by adjusting the image of FIG. 3B by one pixel to the left and one pixel to the upside with respect to the image of FIG. 3C. Thereby, the shake and the blur can be correctly determined by the difference value in the shake blur estimation.

As described above, in the present exemplary embodiment, the reduction and enlargement processings of the image are performed in a power unit of two. The present exemplary embodiment has an effect of processing load reduction owing to a shift operation. The blurred image may be formed using filters of 2×2 as in the conventional technique. However, even in this case, the problem of the position shift is generated, which requires the constitution of the pixel shift according to the present exemplary embodiment to enhance estimation precision.

FIG. 4 is a flow chart illustrating an operation of a shake blur estimation method of the present exemplary embodiment. A program corresponding to the processing of the flow chart illustrated in FIG. 4 is recorded in the ROM 103. The CPU 101 reads out to the RAM 104 and executes the program to realize the processing illustrated in FIG. 4.

Figure 5:
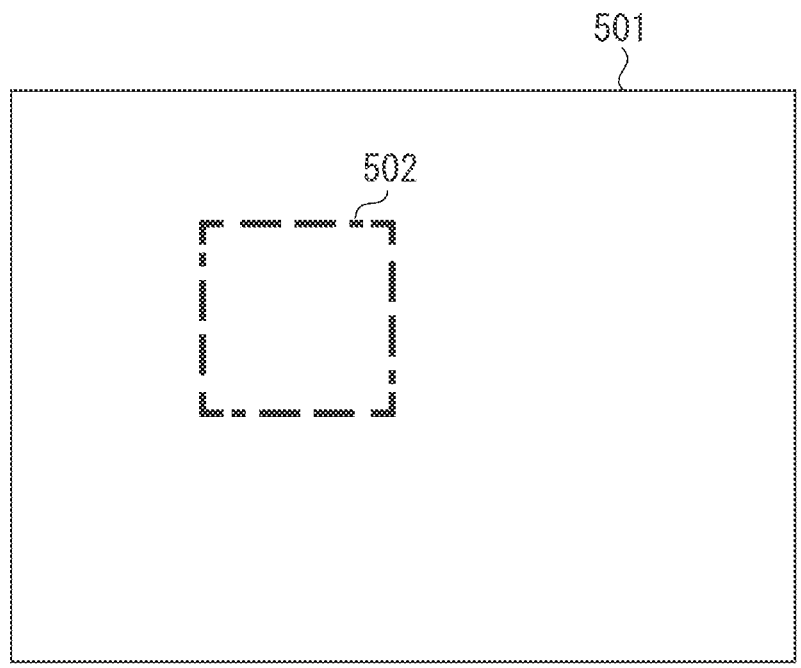
FIG. 5 illustrates an analysis area.

In step S401, the CPU 101 decides an analysis area to be analyzed in a digital photograph image 501 to determine shake and blur. FIG. 5 is a view illustrating the analysis area. The analysis area may be the entire area of the image, or a partial area, such as a main subject area by face detection. Alternatively, a plurality of analysis areas may be set.

Next, the CPU 101 averages the luminance data of pixels included in an analysis area 502 set in step S402 to form a reduced image reduced to ½ in each of horizontal and vertical directions, as described above. In step S403, the CPU 101 forms an enlarged image obtained by enlarging the reduced image formed in step S402 four times in each of the horizontal and vertical directions. Furthermore, in step S404, the CPU 101 forms an enlarged image obtained by enlarging the original image two times in each of the horizontal and vertical directions.

As described above, the enlarged image obtained by enlarging the reduced image four time in step S403 and the enlarged image obtained by enlarging the original image two times in step S404 are shifted from each other by one pixel. In step S405, the CPU 101 acquires a difference value in a state where the positions of the enlarged images are slid by one pixel between the enlarged images. In other words, the CPU 101 decides the relative positions of the enlarged image obtained by enlarging the reduced image four times and the enlarged image obtained by enlarging the original image two times. The CPU 101 compares the decided relative positions with each other to acquire a difference.

At this time, as the evaluation amount of the shake blur estimation, one obtained by adding the difference values between each pixel and normalizing the added difference values with the number of pixels of the analysis area may be utilized. In addition, only the difference values exceeding a predetermined threshold value may be added.

As described above, according to the present exemplary embodiment, the difference is obtained by comparing the image obtained by reducing and enlarging the original image with the original image which is not reduced, and thereby the shake and blur of the original image can be determined. The shift of the image obtained by enlarging the original image two times is corrected in one pixel unit with respect to the image obtained by ½ reduction and four times enlargement of the original image, and thereby the suitable pixels in the above two images can be compared with each other.

Therefore, according to the present exemplary embodiment, the shake and the blur in the image can be correctly determined. Consequently, for example, when an image having less shake and blur is extracted from a plurality of images, a suitable image can be extracted. For example, a frame having less shake and blur is effectively extracted from a plurality of frames constituting a moving image.

The shake blur estimation method according to the luminance data is illustrated with giving priority to the improvement of the speed of the processing in the present exemplary embodiment. However, the present invention is not limited thereto, and may be performed for each channel of each color. Furthermore, the entire estimation value may be constituted by multiple combinations of the respective shake blur estimation values.

Furthermore, the image in which the shake and the blur are determined according to the present exemplary embodiment is not limited to the frame included in the moving image as described above, and may include various images such as a still image photographed by a still camera.

The method for setting the reduction ratio of the reduced image to one step has been described above. On the other hand, a shake blur estimation method utilizing an image reduced at a multistage reduction ratio will be described. Specifically, a reduced image reduced to ½ in each of horizontal and vertical directions is a level 1. Furthermore, a reduced image of a level 2 reduced to ½ in each of the horizontal and vertical directions is formed. Similarly, a deteriorated image of a level N+1 can be formed by reducing a deteriorated image of a level N to ½ in each of the horizontal and vertical directions.

When the reduced image of each level is enlarged to the size of the original image, it is understood that the image has shift of 0.5 pixel as in the reduced image reduced to ½ in the level 1. When the reduced image reduced at a multistage reduction ratio is enlarged, the shift is further increased.

Figure 6:
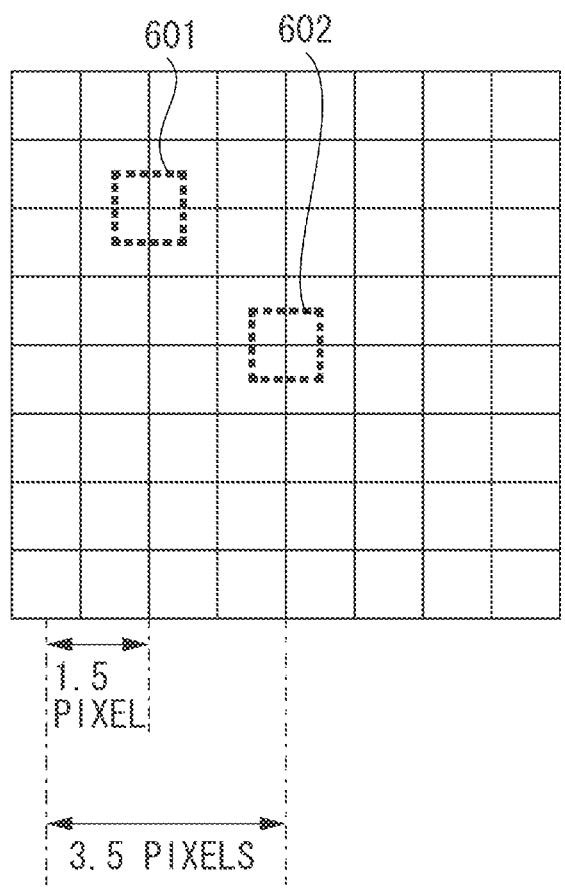
FIG. 6 illustrates pixel shift when enlarging a reduced image reduced at a multistage reduction ratio.

FIG. 6 illustrates pixel shift when enlarging a reduced image reduced at a multistage reduction ratio. For example, when the reduced image of the level 2 is enlarged to the size of the original image, 4×4 pixels are averaged in the reduced image. Thereby, a pixel 601 of the reduced image has shift of 1.5 pixel from the original position. Similarly, when the reduced image of a level 2 is enlarged to the size of the original image, 8×8 pixels are averaged in the reduced image. Thereby, a pixel 602 of the reduced image has shift of 3.5 pixels from the original position.

Consequently, when the reduced image of the level 2 is enlarged eight times to have a size two times that of the original image, the image is shifted by 1.5×2=3 pixels from the original position. Similarly, when the reduced image of the level 3 is enlarged 16 times to have a size two times that of the original image, the image is shifted by 3.5×2=7 pixels from the original position.

Consequently, the difference value may be acquired with sliding, in each of the horizontal and vertical directions, three pixels at the level 2 or seven pixels at the level 3 with respect to the enlarged image which is two times of the original image to acquire the evaluation amount for the shake blur estimation.

Thus, an adjustment amount when adjusting the relative positions in the case of comparison of the two images is decided according to the reduction ratio when forming the reduced image. The adjustment amount may be decided by not only the reduction ratio but also an enlargement ratio when enlarging the reduced image. Specifically, the shift amount of the pixel from the original position is decided according to the reduction ratio when reducing the original image and the enlargement ratio when enlarging the reduced image. Consequently, the adjustment amount when adjusting the relative positions of the two images is decided by the ratio of the size of the reduced image 202 and the size of the re-enlarged image 203.

The multistage shake blur estimation values are calculated thus. However, the final shake blur estimation may be performed by combining these values. For example, as the shake blur of the original image is increased, the difference value is considered to be reduced at many levels. Thereby, the final evaluation amount can be decided by weighting the difference value of each level.

The setting of the analysis area 502 has been described above. Here, a face area in an image is detected by utilizing a face detection technique. The detected face area is the analysis area. When the analysis area is subjected to shake blur estimation, an image having less shake and blur of a face can be extracted from a plurality of images.

When the analysis area is the face area, the sizes of each area for the images are different. Furthermore, when a plurality of faces exists in the same image, the sizes thereof are generally different.

When the shake blur estimation is performed in a plurality of analysis areas having different sizes, the shake blur estimation method of the present exemplary embodiment may be applied after the analysis area is normalized to a predetermined size in advance. Thus, the accuracy of the shake blur estimation can be enhanced by previously normalizing the analysis area.

As described above, according to the present exemplary embodiment, the shake and the blur of the original image can be determined by comparing the image obtained by reducing and enlarging the original image with the original image which is not reduced to obtain the difference. The original image is reduced and enlarged, and the original image is enlarged to match the number of pixels of both the images. The shift of 0.5 pixel is generated in the image obtained by reducing and enlarging the original image. However, the shift of 0.5 pixel is similarly generated also in the original image. Therefore, the shift of the two images is corrected in the pixel unit, and thereby the difference can be obtained by comparing the suitable pixels with each other in the two images.

The example in which the original image is enlarged two times has been illustrated in the exemplary embodiment. However, the original image may be enlarged at a enlarging ratio such as four times or eight times, and the reduced image may be enlarged to match the number of the pixels of the original image.

Furthermore, the image in which the shake and the blur are determined in the exemplary embodiment may be not only the frame extracted from the moving image but also an optional image.

The image processing apparatus described in the exemplary embodiment includes the display device 107 and the output device 110. However, an external display device connected to the image processing apparatus may display an image, or an image may be output to the external output device 110. As the image processing apparatus, various devices such as a personal computer (PC), an imaging device (e.g., a digital still camera or a digital video camera), a printer, and a mobile device (e.g., a mobile phone) may be used.

Other Embodiments

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-161438 filed Jul. 23, 2011, which is hereby incorporated by reference herein in its entirety.

What is claimed is:

1. An image processing apparatus comprising:
a reduction unit configured to reduce an original image;
a first enlargement unit configured to enlarge a reduced image obtained by reduction of the reduction unit;
a second enlargement unit configured to enlarge the original image; and
an analysis unit configured to analyze the original image by comparing a first enlarged image obtained by enlargement of the first enlargement unit with a second enlarged image obtained by enlargement of the second enlargement unit.

2. The image processing apparatus according to claim 1, wherein the analysis unit is configured to decide relative positions of the first enlarged image and the second enlarged image, specify comparison target regions in the first enlarged image and the second enlarged image based on the decided relative positions, and compare the specified comparison target regions with each other.

3. The image processing apparatus according to claim 2, wherein the analysis unit is configured to specify comparison target pixels included in the first enlarged image and the second enlarged image based on the relative positions, and compare levels of the specified comparison target pixels with each other.

4. The image processing apparatus according to claim 2, wherein the analysis unit is configured to determine the relative positions according to a ratio of a size of the reduced image and a size of the first enlarged image.

5. The image processing apparatus according to claim 1, wherein the original image is a frame included in a moving image.

6. The image processing apparatus according to claim 1, further comprising a determining unit configured to determine shake or blur of the original image based on the analysis by the analysis unit.

7. The image processing apparatus according to claim 6, wherein an original image is extracted from a plurality of images, based on the shake or the blur of the original image determined by the determining unit.

8. The image processing apparatus according to claim 1, wherein the analysis unit is configured to compare the first enlarged image and the second enlarged image in unit of a pixel.

9. The image processing apparatus according to claim 1, wherein the reduction unit is configured to reduce the original image to ½, and the first enlargement unit is configured to enlarge the reduced image four times, and the second enlargement unit is configured to enlarge the original image two times.

10. An image processing method comprising:
using at least one processor to perform the steps of:
reducing an original image;
enlarging a reduced image obtained by reduction of the original image;
enlarging the original image; and
analyzing the original image by comparing a first enlarged image obtained by the enlargement of the reduced image with a second enlarged image obtained by the enlargement of the original image.

11. The image processing method according to claim 10, wherein the analyzing step decides relative positions of the first enlarged image and the second enlarged image, specifies comparison target regions in the first enlarged image and the second enlarged image based on the decided relative positions, and compares the specified comparison target regions with each other.

12. The image processing method according to claim 11, wherein the analyzing step specifies comparison target pixels included in the first enlarged image and the second enlarged image based on the relative positions, and compares levels of the specified comparison target pixels with each other.

13. The image processing method according to claim 11, wherein the analyzing step determines the relative positions according to a ratio of a size of the reduced image and a size of the first enlarged image.

14. The image processing method according to claim 10, wherein the original image is a frame included in a moving image.

15. The image processing method according to claim 10, further comprising the step of determining shake or blur of the original image based on the analyzing step.

16. The image processing method according to claim 15, wherein an original image is extracted from a plurality of images, based on the shake or the blur of the original image determined by the determining step.

17. The image processing method according to claim 10, wherein the analyzing step compares the first enlarged image and the second enlarged image in unit of a pixel.

18. The image processing method according to claim 10, wherein the reducing step reduces the original image to ½, and the enlarging the reduced image step enlarges the reduced image four times, and the enlarging the original image step enlarges the original image two times.

19. A non-transitory computer-readable storage medium storing a program for causing a computer to execute an image processing method comprising:
using at least one processor to perform the steps of:
reducing an original image;
enlarging a reduced image obtained by reduction of the original image;
enlarging the original image; and
analyzing the original image by comparing a first enlarged image obtained by the enlargement of the reduced image with a second enlarged image obtained by the enlargement of the original image.

* * * * *